United States Patent
Wu et al.

(10) Patent No.: US 12,308,041 B2
(45) Date of Patent: May 20, 2025

(54) ARTIFICIAL INTELLIGENCE-BASED AUDIO PROCESSING METHOD, APPARATUS, ELECTRONIC DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Wen Wu, Shenzhen (CN); Xianjun Xia, Shenzhen (CN)

(73) Assignee: TENCENT TECHNOLOGY (SHENZHEN) COMPANY LIMITED, Shenzhen (CN)

(\*) Notice: Subject to any disclaimer, the term of this patent is extended or adjusted under 35 U.S.C. 154(b) by 295 days.

(21) Appl. No.: 17/969,977

(22) Filed: Oct. 20, 2022

(65) Prior Publication Data
US 2023/0041256 A1 Feb. 9, 2023

Related U.S. Application Data

(63) Continuation of application No. PCT/CN2021/131187, filed on Nov. 17, 2021.

(30) Foreign Application Priority Data

Dec. 3, 2020 (CN) .......................... 202011410814.4

(51) Int. Cl.
*G10L 15/22* (2006.01)
*G06F 16/65* (2019.01)
*G10L 21/0216* (2013.01)

(52) U.S. Cl.
CPC .......... *G10L 21/0216* (2013.01); *G06F 16/65* (2019.01)

(58) Field of Classification Search
None
See application file for complete search history.

(56) References Cited

U.S. PATENT DOCUMENTS

| 5,974,106 A | 10/1999 | Dupont et al. |
| 8,990,073 B2 * | 3/2015 | Malenovsky ........... G10L 25/78 |
| | | 704/226 |

(Continued)

FOREIGN PATENT DOCUMENTS

| CN | 105120389 A | 12/2015 |
| CN | 106297779 A | 1/2017 |

(Continued)

OTHER PUBLICATIONS

The World Intellectual Property Organization (WIPO) International Search Report for PCT/CN2021/131187 Jan. 30, 2022 6 Pages (including translation).

(Continued)

*Primary Examiner* — Neeraj Sharma
(74) *Attorney, Agent, or Firm* — ANOVA LAW GROUP PLLC

(57) ABSTRACT

An artificial intelligence-based audio processing method includes: obtaining an audio clip of an audio scene, the audio clip including noise; performing audio scene classification processing based on the audio clip to obtain an audio scene type corresponding to the noise in the audio clip; and determining a target audio processing mode corresponding to the audio scene type, and applying the target audio processing mode to the audio clip of the audio scene according to a degree of interference caused by the noise in the audio clip.

19 Claims, 9 Drawing Sheets

(56) References Cited

U.S. PATENT DOCUMENTS

| | | | |
|---|---|---|---|
| 9,870,780 B2* | 1/2018 | Sehlstedt | G10L 25/78 |
| 10,602,268 B1 | 3/2020 | Soto | |
| 11,074,910 B2* | 7/2021 | Lee | G10L 21/0208 |
| 2002/0156623 A1 | 10/2002 | Yoshida | |
| 2008/0181417 A1* | 7/2008 | Pereg | G10L 17/00 |
| | | | 704/E11.001 |
| 2009/0006102 A1* | 1/2009 | Kan | G10L 25/00 |
| | | | 704/E11.001 |
| 2009/0254340 A1* | 10/2009 | Sun | G10L 21/0208 |
| | | | 704/226 |
| 2011/0188671 A1* | 8/2011 | Anderson | H04B 15/00 |
| | | | 381/94.3 |
| 2012/0250883 A1 | 10/2012 | Narita | |
| 2016/0078879 A1* | 3/2016 | Lu | G10L 21/02 |
| | | | 381/56 |
| 2020/0074996 A1 | 3/2020 | Hamada et al. | |
| 2020/0202882 A1* | 6/2020 | Baker | G10L 21/0232 |
| 2020/0349965 A1* | 11/2020 | Nesta | G06N 3/088 |
| 2021/0020191 A1* | 1/2021 | Venneti | G10L 25/51 |
| 2021/0174786 A1* | 6/2021 | Yun | G10L 15/20 |
| 2022/0406326 A1* | 12/2022 | Port | H04R 29/002 |

FOREIGN PATENT DOCUMENTS

| | | |
|---|---|---|
| CN | 109817236 A | 5/2019 |
| CN | 110149167 A | 8/2019 |
| CN | 110197670 A | 9/2019 |
| CN | 110223705 A | 9/2019 |
| CN | 110796027 A | 2/2020 |
| CN | 111723874 A | 9/2020 |
| CN | 111986691 A | 11/2020 |
| CN | 113539283 A | 10/2021 |
| JP | 2002073066 A | 3/2002 |
| JP | 2008145988 A | 6/2008 |
| JP | 2020034683 A | 3/2020 |
| WO | 2011077636 A1 | 6/2011 |

OTHER PUBLICATIONS

The State Intellectual Property Office of the People's Republic of China (SIPO) Office Action 1 for 202011410814.4 Jan. 12, 2024 16 Pages (including translation).

The Japan Patent Office (JPO) Notice of Reasons for Refusal for Application No. 2023-530056 Jul. 29, 2024 18 Pages (including translation).

* cited by examiner

US 12,308,041 B2

ARTIFICIAL INTELLIGENCE-BASED AUDIO PROCESSING METHOD, APPARATUS, ELECTRONIC DEVICE, COMPUTER-READABLE STORAGE MEDIUM, AND COMPUTER PROGRAM PRODUCT

RELATED APPLICATION

This application is a continuation application of PCT Patent Application No. PCT/CN2021/131187 filed on Nov. 17, 2021, which claims priority to Chinese Patent Application No. 202011410814.4 filed with the National Intellectual Property Administration, PRC on Dec. 3, 2020, all of which are incorporated herein by reference in entirety.

FIELD OF THE TECHNOLOGY

The present disclosure relates to a cloud technology and an artificial intelligence technology, and in particular, to an artificial intelligence-based audio processing method, apparatus, electronic device, computer-readable storage medium, and computer program product.

BACKGROUND

Artificial Intelligence (AI) is a technology in computer science, which studies the design principles and implementation methods of various intelligent machines, so that the machines can perceive, infer, and make decisions. Artificial intelligence technology is a discipline covering a range of fields, such as natural language processing technology and machine learning/deep learning. With the development of technologies, artificial intelligence technology will be applied in more fields, and play a more increasingly important value. For example, in cloud-based web conferencing scenarios, artificial intelligence technology is introduced to improve audio quality.

However, audio processing methods in certain existing art are relatively simple. Although the noise in the audio may be suppressed, the quality of useful signals in the audio (for example, speech signals) is inevitably met with limitations.

SUMMARY

Embodiments of the present disclosure provide an artificial intelligence-based audio processing method, apparatus, electronic device, computer-readable storage medium, and computer program product, which can improve audio quality by performing targeted audio processing based on audio scenes.

In one aspect, the present disclosure provides an artificial intelligence-based audio processing method, including: obtaining an audio clip of an audio scene, the audio clip including noise; performing audio scene classification processing based on the audio clip to obtain an audio scene type corresponding to the noise in the audio clip; and determining a target audio processing mode corresponding to the audio scene type, and applying the target audio processing mode to the audio clip according to a degree of interference caused by the noise in the audio clip.

In another aspect, the present disclosure provides an audio processing apparatus, including: a memory storing computer program instructions; and a processor coupled to the memory and configured to execute the computer program instructions and perform: obtaining an audio clip of an audio scene, the audio clip including noise; performing audio scene classification processing based on the audio clip to obtain an audio scene type corresponding to the noise in the audio clip; and determining a target audio processing mode corresponding to the audio scene type, and applying the target audio processing mode to the audio clip according to a degree of interference caused by the noise in the audio clip.

In yet another aspect, the present disclosure provides a non-transitory computer-readable storage medium storing computer program instructions executable by at least one processor to perform: obtaining an audio clip of an audio scene, the audio clip including noise; performing audio scene classification processing based on the audio clip to obtain an audio scene type corresponding to the noise in the audio clip; and determining a target audio processing mode corresponding to the audio scene type, and applying the target audio processing mode to the audio clip according to a degree of interference caused by the noise in the audio clip.

Certain embodiment(s) of the present disclosure has the following beneficial effects:

An audio scene type corresponding to an audio is identified based on an association between noise and audio scene types, and targeted audio processing is performed based on the audio scene type, so that an audio processing mode introduced in the audio scene is suitable for the noise included in the audio scene, thereby maintaining useful information in the audio, and improving the accuracy of audio processing.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
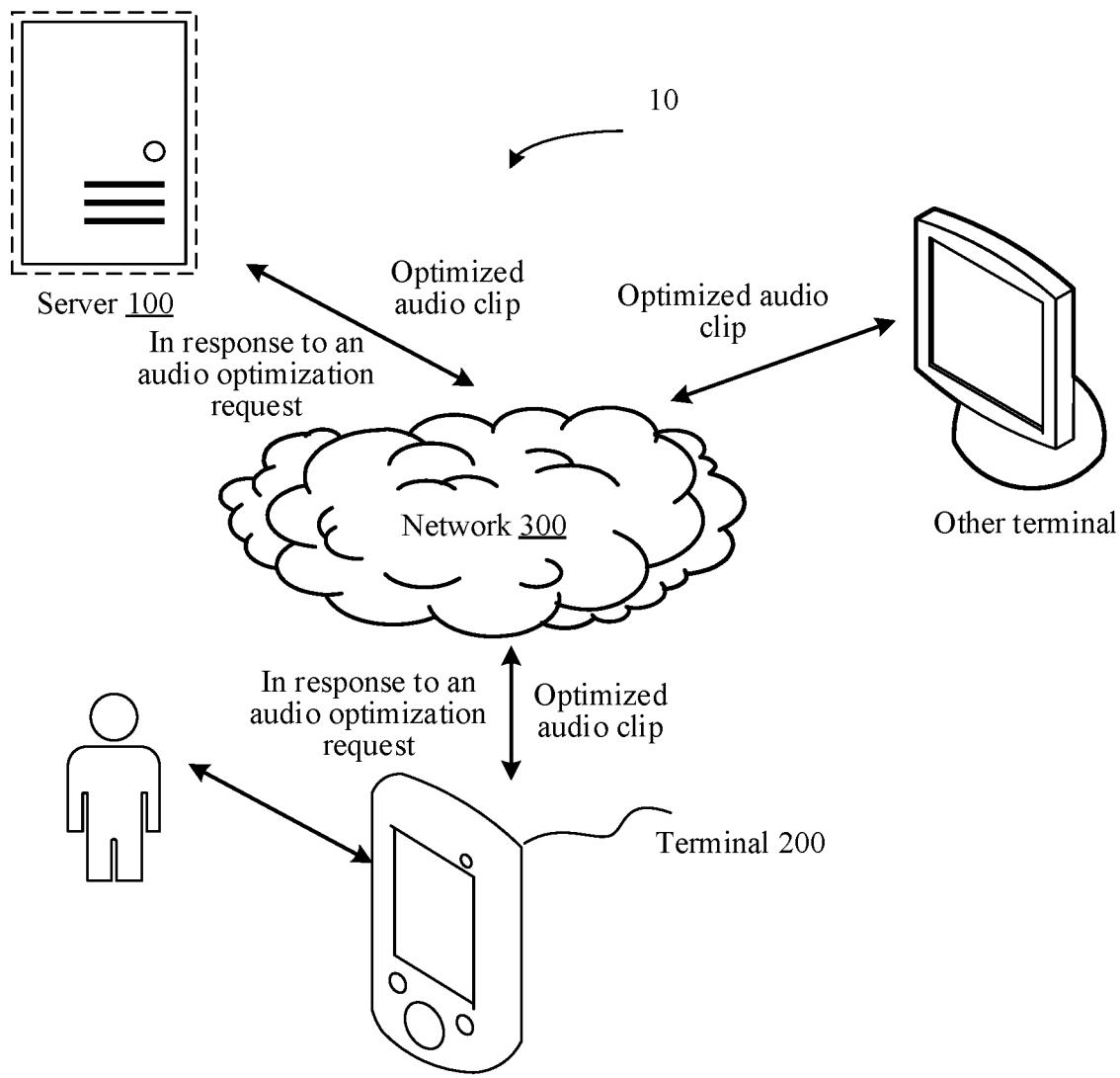
FIG. 1 is a schematic diagram of an implementation scenario of an audio processing system according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

Before the embodiments of the present disclosure are further described in detail, terms involved in the embodiments of the present disclosure are described. The terms provided in the embodiments of the present disclosure are applicable to the following explanations.

1) Convolutional neural network (CNN): It is a type of feedforward neural network (FNN) including convolutional computation and having a deep structure, and is one of the representative algorithms of deep learning. The convolutional neural network has a representation learning capability and can perform shift-invariant classification of input images according to its hierarchical structure.

2) Residual Network (ResNet): It is a convolutional neural network that is easy to adjust and can improve the accuracy by adding a considerable depth. Residual blocks in the residual network use skip connections to alleviate the gradient disappearance problem caused by increasing the depth in deep neural networks.

3) Audio processing mode: It is a mode for audio processing. By applying the audio processing mode to an audio clip, the audio can be adjusted to obtain a clear and smooth audio. The audio processing mode in the embodiments of the present disclosure includes a noise reduction processing mode and a bitrate switching processing mode.

An adaptive bitrate streaming (ABR) technology can adjust the video bitrate adaptively, and the bitrate adjustment algorithm is mostly used in video playback to automatically adjust the video bitrate (i.e., resolution) according to a network status or a playback buffer status at a client. The noise reduction algorithm based on pervasive noise uses a spectrum feature of noisy speech as an input to the neural network and clean speech as a reference output of the neural network to train a noise reduction model, and uses a least mean square (LMS) error as an adjustment goal. After the noise reduction function is turned on, the same noise reduction method is used for various scene environments.

It is found during the implementation of the present disclosure that since the network environment quality fluctuates frequently, the bitrate switching based on the network speed also frequently changes accordingly, and the frequent resolution switching greatly affects the user experience. Specific noise of a specific scene in an actual environment poses higher desirables and challenges to the robustness of the noise reduction algorithm based on pervasive noise.

To solve the above problems, the embodiments of the present disclosure provide an artificial intelligence-based audio processing method, apparatus, electronic device, and computer-readable storage medium, which can improve audio quality by performing targeted audio processing based on audio scenes.

The artificial intelligence-based audio processing method provided in the embodiments of the present disclosure may be independently implemented by a terminal or a server, or may be implemented jointly by a terminal and a server. For example, the terminal alone is responsible for the artificial intelligence-based audio processing method described below. Alternatively, terminal A transmits an audio adjustment request (including an audio clip) to a server; the server executes an artificial intelligence-based audio processing method according to the received audio adjustment request, applies a target audio processing mode (including a noise reduction processing mode and a bitrate switching processing mode) to an audio clip of an audio scene in response to the audio adjustment request, and transmits the processed audio clip to terminal B, so that terminal A and terminal B can have a clear voice call.

An electronic device for audio processing in the embodiments of the present disclosure may be various types of terminal devices or servers. The server may be an independent physical server, a server cluster or a distributed system including multiple physical servers, or a cloud server that provides cloud computing services. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner, which is not limited in the present disclosure.

For example, the server may be a server cluster deployed in a cloud to provide an AI as a Service (AIaaS) to users. The AIaaS platform splits several types of common AI services and provide independent services or packaged services in the cloud. Such a service model is similar to an AI-themed mall. All users can access one or more artificial intelligence services provided by the AIaaS platform through application programming interfaces.

For example, one of the artificial intelligence cloud services may be an audio processing service, that is, an audio processing program provided in the embodiments of the present disclosure is installed on a server in the cloud. The user calls the audio processing service in the cloud service through the terminal (running a client, such as an audio recording client, an instant messaging client, etc.), so that the server deployed in the cloud calls the installed audio processing program to determine a target audio processing mode matching an audio scene type and apply the target audio processing mode to the audio clip of the audio scene.

For an audio recording client, a user may be a contracted anchor of an audio platform and releases audios of an audio book regularly. However, the scene where the anchor records audios may change. For example, the anchor may record audios at home, in a library, or even outdoors. Different noise is present in these scenes. Audio recording is performed in the current audio scene, audio scene identification is performed on the recorded audio clip to determine the audio scene type, targeted noise reduction processing is performed on the audio clip based on the audio scene type, and the denoised audio clip is stored, thereby achieving a function of audio recording with denoising.

For an instant messaging client, a user may transmit a voice message to a certain friend or to a certain chat group. However, the current scene where the user is located may change. For example, the user may be in an office, a shopping mall, etc. Different noise exists in different scenes. Speech scene identification is performed on the speech of the current scene to determine a speech scene type, targeted noise reduction processing is performed on the speech based on the speech scene type, and the denoised audio clip is transmitted, thereby achieving a function of transmitting denoised speech.

For a conference client, users participating in a conference may have a voice call in different environments. For example, user A participating in the conference is in an office, user B participating in the conference is on a high-speed rail. Different noise is present in different scenes, and the communication signal strength varies with different scenes. For example, the high-speed rail has car noise and relatively poor communication signal strength. Speech scene identification is performed for the voice call of the participating users to determine speech scene types of the participating users, and targeted bitrate switching processing is performed on the speech of the participating users based on the voice speech scene types to realize adaptive bitrate switching, thereby improving the call quality of the conference call.

Referring to FIG. 1, FIG. 1 is a schematic diagram of an implementation scene of an audio processing system 10 according to an embodiment of the present disclosure. A terminal 200 is connected to a server 100 through a network 300. The network 300 may be a wide area network, a local area network, or a combination of thereof.

The terminal 200 (on which a client, such as an audio recording client, an instant messaging client, a call client, etc., runs) may be used to obtain an audio adjustment request. For example, the user inputs or records an audio clip of an audio scene through the terminal 200, and the terminal 200 automatically obtains the audio clip of the audio scene and automatically generates the audio adjustment request.

In some embodiments, the client running in the terminal may be implanted with an audio processing plug-in to implement the artificial intelligence-based audio processing method locally on the client. For example, after obtaining the audio adjustment request (including the audio clip of the audio scene), the terminal 200 calls the audio processing plug-in to implement the artificial intelligence-based audio processing method to identify an audio scene type corresponding to noise in the audio clip, and based on a target audio processing mode matching the audio scene type, applies the target audio processing mode to the audio clip of the audio scene. For example, for an audio recording application, the user performs audio recording in the current audio scene, performs audio scene identification on the recorded audio clip to determine the audio scene type, performs targeted noise reduction processing on the audio clip based on the audio scene type, and stores the denoised audio clip, thereby achieving a function of audio recording with denoising.

In some embodiments, after obtaining the audio adjustment request, the terminal 200 calls an audio processing interface of the server 100 (which may be provided in the form of a cloud service, that is, an audio processing service). The server 100 identifies an audio scene type corresponding to noise in the audio clip, and based on a target audio processing mode matching the audio scene type, applies the target audio processing mode to the audio clip of the audio scene, and transmits the audio clip having being processed by the target audio processing mode (adjusted audio clip) to the terminal 200 or other terminals. For example, for an audio recording application, the user performs audio recording in the current audio scene. The terminal 200 obtains the corresponding audio clip, automatically generates an audio adjustment request, and transmits the audio adjustment request to the server 100. Based on the audio adjustment request, the server 100 performs audio scene identification on the recorded audio clip to determine the audio scene type, performs targeted noise reduction processing on the audio clip based on the audio scene type, and stores the denoised audio clip, thereby achieving a function of audio recording with denoising. For an instant messaging application, when a user transmits a voice message in the current speech scene, the terminal 200 obtains a corresponding audio clip, automatically generates an audio adjustment request, and transmits the audio adjustment request to the server 100. Based on the audio adjustment request, the server 100 performs speech scene identification on the audio clip to determine the speech scene type, performs targeted noise reduction processing on the audio clip based on the speech scene type, and transmits the denoised audio clip, thereby achieving a function of transmitting the denoised speech; and performs targeted bitrate switching processing on the audio clip based on the speech scene type to realize adaptive bitrate switching, thereby improving the quality of the voice call. For a call application, user A has a voice call with user B. User A makes a voice call in the current speech scene. The terminal 200 obtains an audio clip corresponding to user A, automatically generates an audio adjustment request, and transmits the audio adjustment request to the server 100. Based on the audio adjustment request, the server 100 performs speech scene identification on the audio clip of user A to determine the speech scene type, performs targeted noise reduction processing on the audio clip based on the speech scene type, and transmits the denoised audio clip of user A to user B, thereby achieving a voice call function with denoising.

Figure 2:
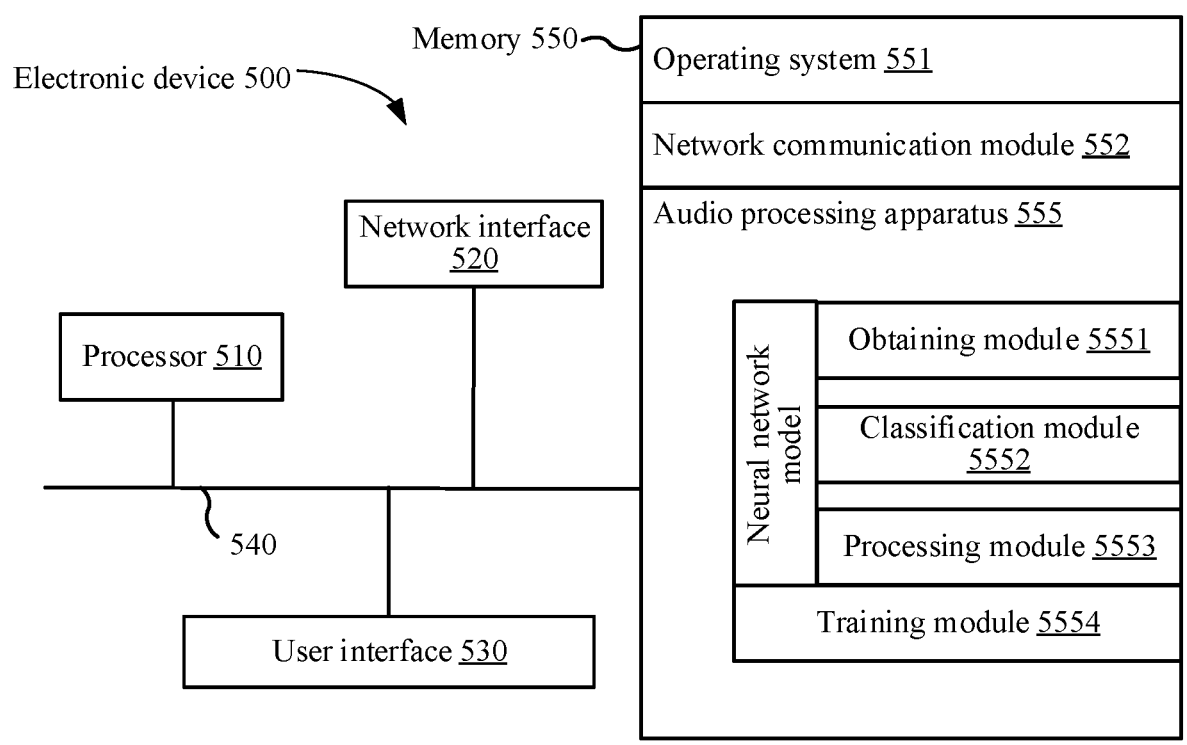
FIG. 2 is a schematic structural diagram of an electronic device for audio processing according to certain embodiment(s) of the present disclosure.

The following describes the structure of the electronic device for audio processing according to the embodiments of the present disclosure. Referring to FIG. 2, FIG. 2 is a schematic structural diagram of an electronic device 500 for audio processing according to an embodiment of the present disclosure. For example, the electronic device 500 is a server. The electronic device 500 for audio processing shown in FIG. 2 includes at least one processor 510, a memory 550, at least one network interface 520, and a user interface 530. All the components in the electronic device 500 are coupled together by using a bus system 540. It may be understood that, the bus system 540 is configured to implement connection and communication between the components. In addition to a data bus, the bus system 540 further includes a power bus, a control bus, and a state signal bus. However, for ease of clear description, all types of buses in FIG. 2 are marked as the bus system 540.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any suitable processor, or the like.

The memory 550 includes a volatile memory or a non-volatile memory, or may include both a volatile memory and a non-volatile memory. The non-volatile memory may be a read-only memory (ROM). The volatile memory may be a random access memory (RAM). The memory 550 described in this embodiment of the present disclosure is to include any other suitable type of memories. In certain embodiment(s), the memory 550 includes one or more storage devices that are physically remote from the processor 510.

In some embodiments, the memory 550 may store data to support various operations. Examples of the data include a program, a module, and a data structure, or a subset or a superset thereof, which are described below by using examples.

An operating system 551 includes a system program configured to process various system services and perform a hardware-related task, such as a framework layer, a core library layer, or a driver layer, and is configured to implement various services and process a hardware-based task.

A network communication module 552 is configured to reach another computing device through one or more (wired or wireless) network interfaces 520. Exemplary network interfaces 520 include: Bluetooth, wireless compatible authentication (Wi-Fi), a universal serial bus (USB), and the like.

In some embodiments, the audio processing apparatus provided in the embodiments of the present disclosure may be implemented using software, and, for example, may be the audio processing plug-in in the terminal described above, or the audio processing service in the server described above. The present disclosure is not limited thereto, and the audio processing apparatus provided in the embodiments of the present disclosure may be provided as various software embodiments, including various forms including an application, software, a software module, a script, or a code.

FIG. 2 shows an audio processing apparatus 555 stored in the memory 550, which may be software in the form of a program or plug-in, such as an audio processing plug-in, and includes a series of modules, including an obtaining module 5551, a classification module 5552, a processing module 5553, and a training module 5554; The obtaining module 5551, the classification module 5552, and the processing module 5553 are configured to implement the audio processing function provided in the embodiments of the present disclosure, and the training module 5554 is configured to train a neural network model. The audio scene classification processing is implemented by the neural network model.

Figure 3:
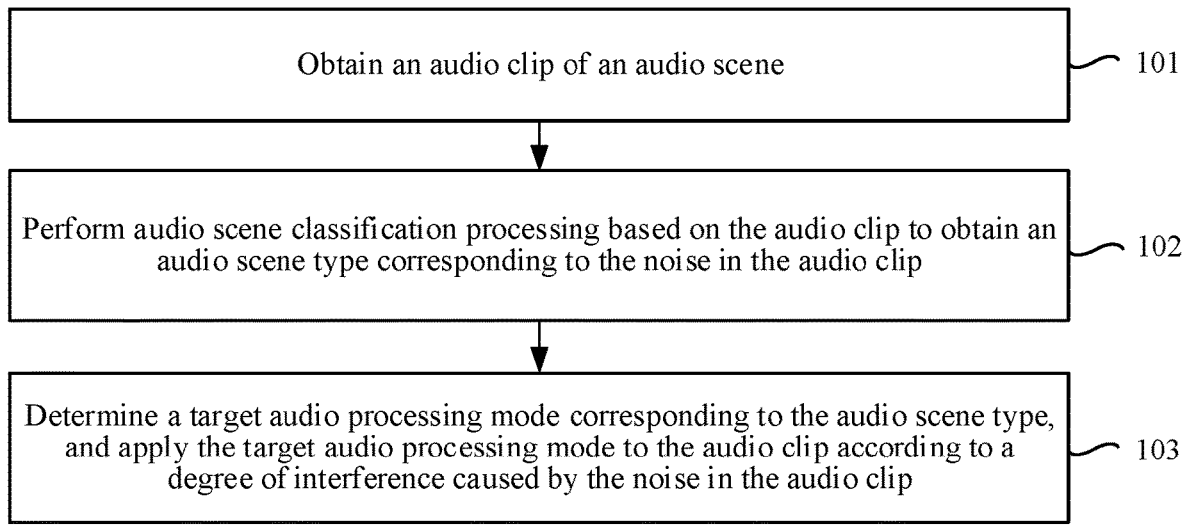
FIG. 3 to FIG. 5 are each a schematic flowchart of an artificial intelligence-based audio processing method according to certain embodiment(s) of the present disclosure.

As mentioned above, the artificial intelligence-based audio processing method provided in the embodiments of the present disclosure may be implemented by various types of electronic devices. Referring to FIG. 3, FIG. 3 is a schematic flowchart of an artificial intelligence-based audio processing method according to an embodiment of the present disclosure. The method will be described below with reference to the steps shown in FIG. 3.

In the following steps, the audio scene refers to an environment in which an audio is generated, such as a home environment, an office environment, and an external environment when taking various types of transportation such as high-speed rail.

Step 101. Obtain an audio clip of an audio scene, the audio clip including noise.

As an example of obtaining the audio clip, a user inputs an audio through a terminal (running a client) in the current audio scene. The terminal 200 obtains a corresponding audio clips, automatically generates an audio adjustment request, and transmits the audio adjustment request to a server. The server parses the audio adjustment request to obtain the audio clip of the audio scene, to subsequently perform audio scene identification based on the audio clip.

Step 102. Perform audio scene classification processing based on the audio clip to obtain an audio scene type corresponding to the noise in the audio clip.

For example, after the audio clip of the audio scene is obtained, the neural network model may be used to perform audio scene classification processing based on the audio clip to obtain the audio scene type corresponding to the noise in the audio clip. The audio clip may be inputted into the neural network model, or a time domain feature or frequency domain feature of the audio clip may be inputted into the neural network model. The neural network model performs audio scene classification processing based on the time domain feature or frequency domain feature of the audio clip, to obtain the audio scene type corresponding to the noise in the audio clip. Taking the frequency domain feature of the audio clip as an example, after the audio clip is obtained, framing processing is first performed on a time-domain signal of the audio clip to obtain a multi-frame audio signal, the multi-frame audio signal is windowed, and a Fourier transform is performed on the windowed audio signal to obtain a frequency domain signal of the audio clip. A Mel band of the frequency domain signal is logarithmically processed to obtain the frequency domain feature of the audio clip, that is, the audio clip used for audio scene classification.

To enable the neural network model to process a multi-channel input, a derivative of the frequency domain feature of the audio clip obtained by logarithmic processing may be found to obtain a first-order derivative of the audio clip, and a derivative of the first-order derivative may be found to a second-order derivative of the audio clip. Finally the frequency domain feature, the first-order derivative, and the second-order derivative of the audio clip are combined into three channels of input signals, and the three channels of input signals is used as an audio clip used for audio scene classification.

In some embodiments, the audio scene classification processing is implemented by a neural network model, and the neural network model learns an association between the noise included in the audio clip and the audio scene type; and the performing audio scene classification processing based on the audio clip to obtain an audio scene type corresponding to the noise in the audio clip includes: calling the neural network model based on the audio clip to perform the audio scene classification processing to obtain an audio scene type having an association with the noise included in the audio clip.

Figure 6:
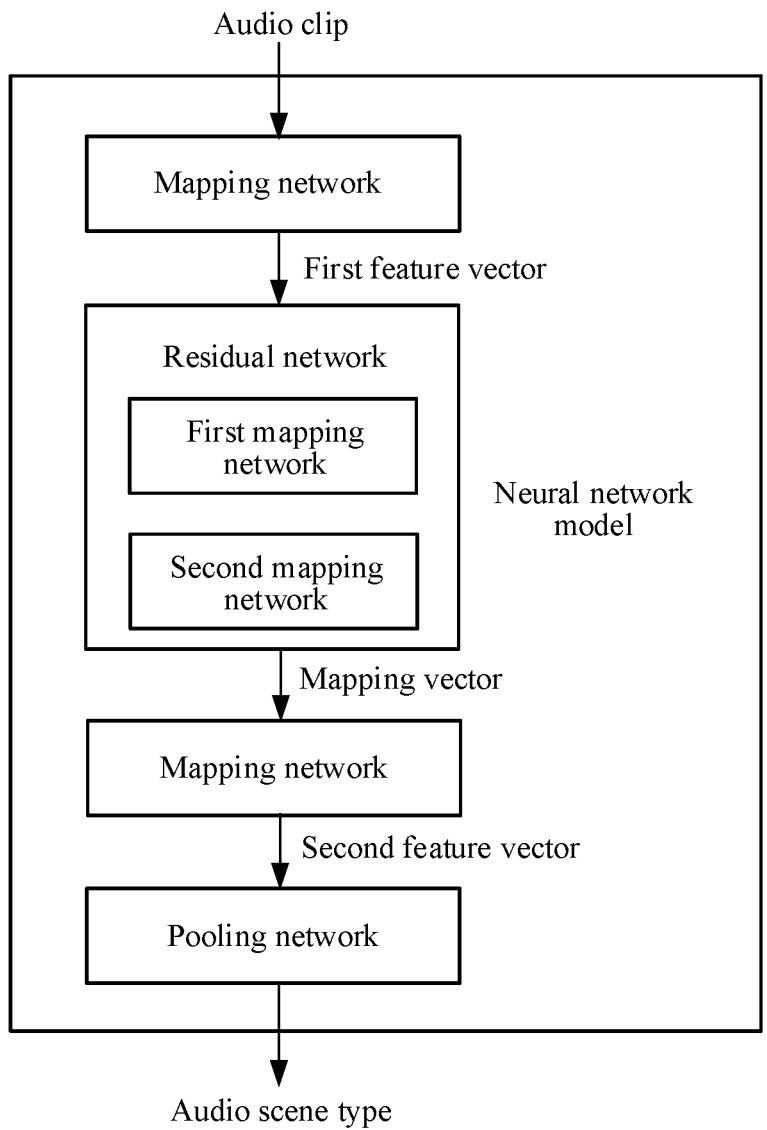
FIG. 6 is a schematic structural diagram of a neural network model according to certain embodiment(s) of the present disclosure.

For example, as shown in FIG. 6, the neural network model includes a mapping network, a residual network, and a pooling network; and the calling a neural network model based on the audio clips to perform audio scene classification processing includes: performing feature extraction processing on the audio clip through the mapping network to obtain a first feature vector of the noise in the audio clip; performing mapping processing on the first feature vector through the residual network to obtain a mapping vector of the audio clip; performing feature extraction processing on the mapping vector of the audio clip through the mapping network to obtain a second feature vector of the noise in the audio clip; performing pooling processing on the second feature vector through the pooling network to obtain a pooled vector of the audio clip; and performing non-linear mapping processing on the pooled vector of the audio clip to obtain the audio scene type having an association with the noise included in the audio clip.

In the above example, the mapping network includes a plurality of cascaded mapping layers; and the calling a neural network model based on the audio clips to perform audio scene classification processing includes: performing feature mapping processing on the audio clip through a first mapping layer in the plurality of cascaded mapping layers; outputting a mapping result of the first mapping layer to a subsequent mapping layer in the plurality of cascaded mapping layers, and continuing to perform feature mapping and mapping result outputting through the subsequent mapping layer, until an output is provided to a last mapping layer; and determining a mapping result outputted by the last mapping layer as the first feature vector of the noise in the audio clip.

The mapping network can effectively extract a scene noise feature in the audio clip. The mapping layer may be a convolutional neural network. However, the embodiments of the present disclosure are not limited thereto, and the mapping layer may also be other neural networks.

In some embodiments, the residual network includes a first mapping network and a second mapping network; and the performing mapping processing on the first feature vector through the residual network to obtain a mapping vector of the audio clip includes: performing mapping processing on the first feature vector through the first mapping network to obtain a first mapping vector of the audio clip; performing nonlinear mapping processing on the first mapping vector to obtain a non-mapping vector of the audio clip; performing mapping processing on the non-mapping vector of the audio clip through the first mapping network to obtain a second mapping vector of the audio clip; and determining a summation result of the first feature vector of the audio clip and the second mapping vector of the audio clip as the mapping vector of the audio clip.

The residual network can effectively prevent the gradient disappearance problem in the training error propagation of the neural network, to speed up the training of the neural network model.

In some embodiments, the neural network model is trained so that the trained neural network model can perform audio scene classification. A training method is as follows: constructing audio samples respectively corresponding to a plurality of different audio scenes based on a noise-free audio signal and background noise respectively corresponding to the plurality of different audio scenes; and training a neural network model based on the audio samples respectively corresponding to the plurality of different audio scenes to obtain a neural network model for audio scene classification.

To enhance the diversity of sample data, a method for constructing audio samples is as follows: performing following processing for any one of the plurality of different audio scenes: fusing the background noise of the audio scene and the noise-free audio signal based on a fusion ratio of the background noise of the audio scene and the noise-free audio signal to obtain a first fused audio signal of the audio scene; fusing the background noise of the audio scene corresponding to a first random coefficient in the first fused audio signal to obtain a second fused audio signal of the audio scene; and fusing the noise-free audio signal corresponding to a second random coefficient in the second fused audio signal to obtain an audio sample of the audio scene.

For example, after maintained human voice (noise-free audio signal) and background noise are fused at a fusion ratio of 1:1, the human voice and the background noise are further superimposed based on some random ratios, for example, a noise superposition coefficient (first random coefficient) which is a random number ranging from 0.3 to 0.5, and a human voice superposition coefficient (second random coefficient) which is a random number ranging from 0.5 to 0.7.

In some embodiments, the training a neural network model based on the audio samples respectively corresponding to the plurality of different audio scenes to obtain a neural network model for audio scene classification includes: performing audio scene classification processing on the audio samples respectively corresponding to the plurality of different audio scenes through the neural network model, to obtain predicted audio scene types of the audio samples; constructing a loss function of the neural network model based on the predicted audio scene types of the audio samples, audio scene annotations of the audio samples, and weights of the audio samples; and updating a parameter of the neural network model until the loss function converges, and determining the updated parameter of the neural network model that causes the loss function to converge as a parameter of the neural network model for audio scene classification.

For example, after the value of the loss function of the neural network model is determined based on the predicted audio scene types of the audio samples, the audio scene annotations of the audio samples, and the weights of the audio samples, it may be determined whether the value of the loss function of the neural network model exceeds a preset threshold. When the value of the loss function of the neural network model exceeds the preset threshold, an error signal of the neural network model is determined based on the loss function of the neural network model, error information is back-propagated in the neural network model, and a model parameter of each layer is updated during the propagation.

The back-propagation is described herein. Training sample data is inputted into an input layer of a neural network model, passes through a hidden layer, and finally, and reaches an output layer, and a result is outputted, which is a forward propagation process of the neural network model. Because there is an error between an output result of the neural network model and an actual result, an error between the output result and an actual value is calculated, and the error is back-propagated from the output layer to the hidden layer until it is propagated to the input layer. In the back-propagation process, the value of the model parameter is adjusted according to the error. The process is iterated until convergence is achieved.

Step 103. Determine a target audio processing mode corresponding to the audio scene type, and applying the target audio processing mode to the audio clip according to a degree of interference caused by the noise in the audio clip.

For example, after the audio scene type is obtained, the target audio processing mode matching the audio scene type is first determined, and the target audio processing mode is applied to the audio clip of the audio scene to perform targeted audio adjustment, thereby improving the accuracy of audio processing.

Figure 4:
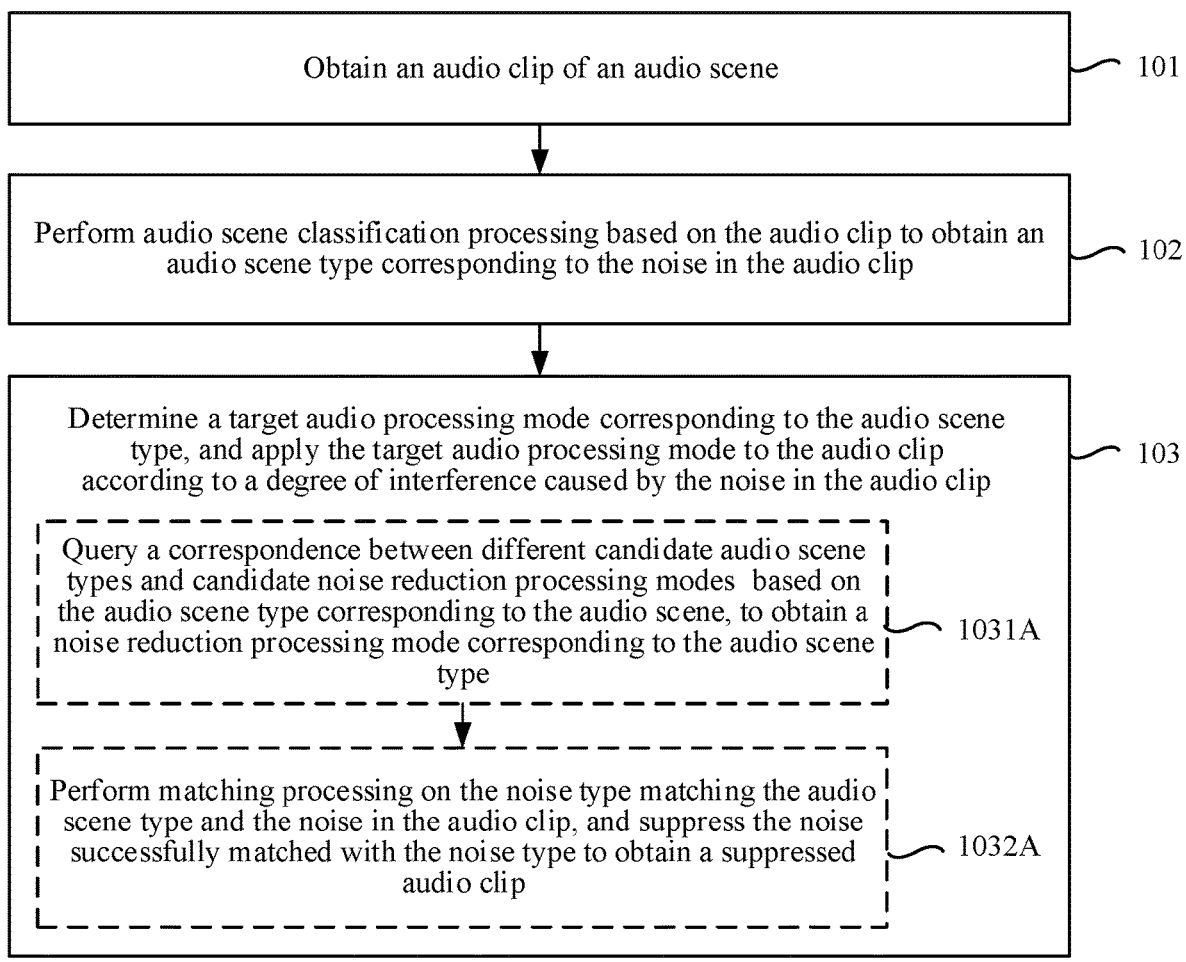

Referring to FIG. 4, FIG. 4 is an optional schematic flowchart of an artificial intelligence-based audio processing method according to an embodiment of the present disclosure. FIG. 4 shows that step 103 in FIG. 3 may be implemented through steps 1031A to 1032A shown in FIG. 4: the target audio processing mode includes a noise reduction processing mode. Step 1031A. Query a correspondence between different candidate audio scene types and candidate noise reduction processing modes based on the audio scene type corresponding to the audio scene, to obtain a noise reduction processing mode matching the audio scene type. Step 1032A. Perform matching processing on the noise type matching the audio scene type and the noise in the audio clip, and suppress the noise successfully matched with the noise type to obtain a suppressed audio clip, a ratio of a speech signal strength to a noise signal strength in the suppressed audio clip being lower than a signal-to-noise ratio threshold.

For example, according to an implementation scene, a mapping table including the correspondence between different candidate audio scene types and candidate noise reduction processing modes is pre-built, and the mapping table is stored in a storage space. By reading the correspondence between the different candidate audio scene types and candidate noise reduction processing modes included in the mapping table in the storage space, the noise reduction processing mode matching the audio scene type may be quickly found based on the audio scene type corresponding to the audio scene, and the noise reduction processing mode may be applied to the audio clip of the audio scene to remove the noise of the audio clip of the audio scene, thereby achieving targeted denoising and improving the audio quality (that is, the audio resolution) of the audio clip.

In some embodiments, the target audio processing mode includes a noise reduction processing mode; and the determining a target audio processing mode corresponding to the audio scene type includes: determining a noise type matching the audio scene type based on the audio scene type corresponding to the audio scene; and querying a correspondence between different candidate noise types and candidate noise reduction processing modes based on the noise type matching the audio scene type, to obtain a noise reduction processing mode corresponding to the audio scene type, noise types matching different audio scene types being not exactly the same.

For example, the noise type matching the audio scene type is first determined based on the audio scene type corresponding to the audio scene, and the noise reduction processing mode matching the audio scene type is obtained based on the noise type matching the audio scene type, that is, decoupling of the audio scene types from candidate noise reduction processing modes is implemented, so that subsequently the correspondence between audio scene types and candidate noise reduction processing modes can be flexibly adjusted.

For example, since the client developer may have different strategies for assigning noise reduction processing modes for different noise or different users may have different desirables on noise reduction processing modes for different noise. Therefore, if a mapping relationship between audio scene types of audio scenes and noise reduction processing modes is implemented through the neural network model, a number of models are trained. Once the assignment of the noise reduction processing modes for different noise is changed, the neural network model is retrained, which consumes a lot of computing resources.

However, if only a mapping relationship between audio scene types of the audio clips and noise is implemented through the neural network model, various desirables on the noise reduction processing mode in practical implementations can be satisfied by training one neural network model, as long as the setting of the strategy for noise types and noise reduction processing modes is realized in the client. Even if the assignment of the noise reduction processing modes for different noise is changed, only the setting of the strategy for noise types and noise reduction processing modes is adjusted in the client, to avoid consuming a lot of computing resources to train neural network models.

In some embodiments, the applying the target audio processing mode to the audio clip according to a degree of interference caused by the noise in the audio clip includes: determining the degree of interference caused by the noise in the audio clip; and applying the noise reduction processing mode corresponding to the audio scene type to the audio clip of the audio scene in response to the degree of interference being greater than an interference degree threshold.

For example, when the noise in the audio clip has little effect on the audio clip, the noise reduction processing may not be performed, and the noise reduction processing is performed on the audio clip only when the noise in the audio clip affects the audio clip. For example, when a user is recording an audio, although some noises of the audio scene is recorded during the recording, these noises do not affect the effect of the recording, so the noise reduction processing may not be performed on the recording. When these noises affect the effect of the recording (for example, the content of the recording cannot be heard clearly), the noise reduction processing may be performed on the recording.

Figure 5:
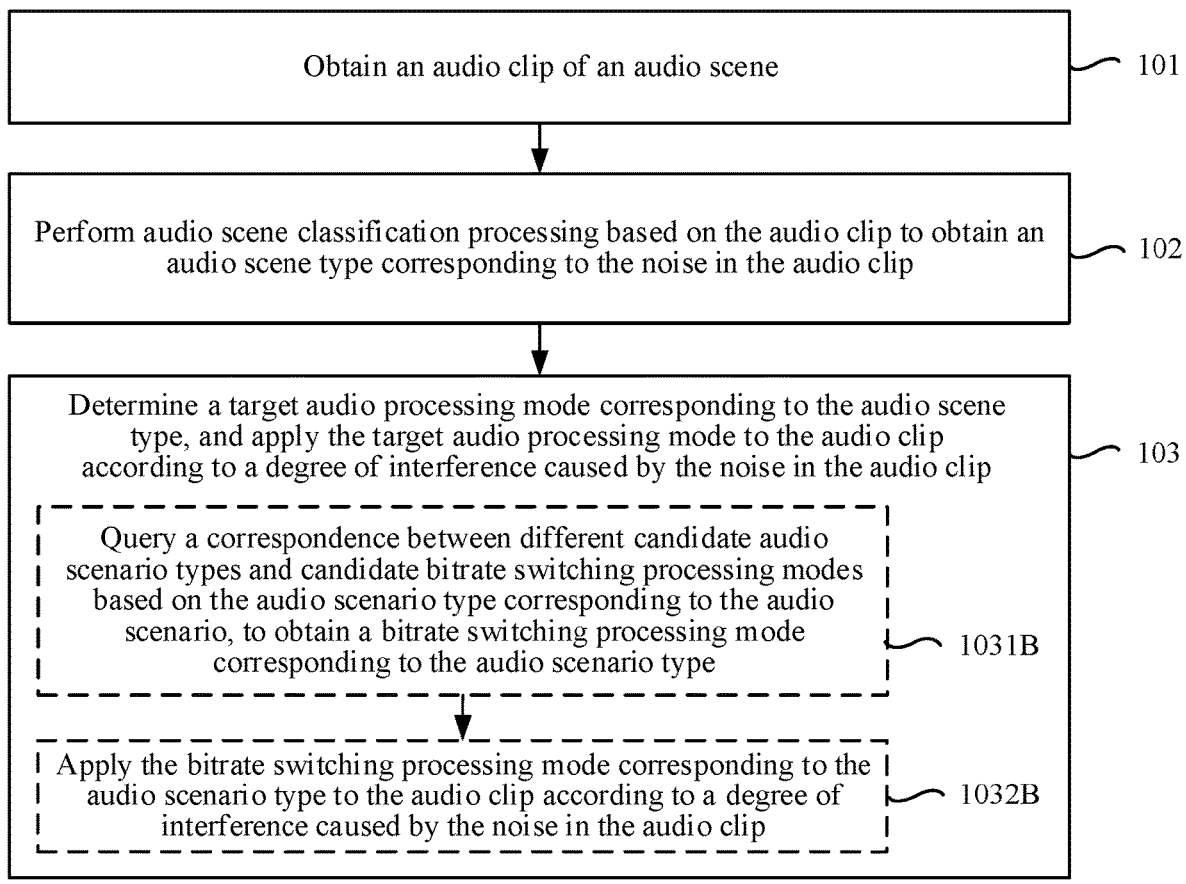

Referring to FIG. 5, FIG. 5 is an optional schematic flowchart of an artificial intelligence-based audio processing method according to an embodiment of the present disclosure. FIG. 5 shows that step 103 in FIG. 3 may be implemented through steps 1031B-1032B shown in FIG. 5: the target audio processing mode includes a bitrate switching processing mode. Step 1031B. Query a correspondence between different candidate audio scene types and candidate bitrate switching processing modes based on the audio scene type corresponding to the audio scene, to obtain a bitrate switching processing mode corresponding to the audio scene type. Step 1032B. Apply the bitrate switching processing mode corresponding to the audio scene type to the audio clip.

For example, according to an implementation scene, a mapping table including the correspondence between different audio scene types and candidate bitrate switching processing modes is pre-built, and the mapping table is stored in a storage space. By reading the correspondence between the different audio scene types and candidate bitrate switching processing modes included in the mapping table in the storage space, the bitrate switching processing mode matching the audio scene type may be quickly found based on the audio scene type corresponding to the audio scene, and the bitrate switching processing mode may be applied to the audio clip of the audio scene to switch the bitrate of the audio clip, thereby achieving targeted bitrate switching and improving the fluency of the audio clip.

In some embodiments, the target audio processing mode includes a bitrate switching processing mode. the determining a target audio processing mode corresponding to the audio scene type includes: comparing the audio scene type corresponding to the audio scene with a preset audio scene type; and determining a bitrate switching processing mode associated with the preset audio scene type as a bitrate switching processing mode corresponding to the audio scene type in response to determining through the comparison that the audio scene type is the preset audio scene type.

For example, not all audio scenes desire bitrate switching. For example, an office environment where the communication signal strength is relatively stable does not desire bitrate switching, while a high-speed rail environment with weak and unstable signal strength desires bitrate switching. Therefore, before determining the bitrate switching processing mode, it is desirable to compare the audio scene type with the preset audio scene type that desires bitrate switching. Only when it is determined through comparison that the audio scene type belongs to the preset audio scene type that desires bitrate switching, the bitrate switching processing mode associated with the preset audio scene type is determined as the bitrate switching processing mode matching the audio scene type, to avoid resource waste generated in scenarios where bitrate switching is desired in all scenes.

In some embodiments, the applying the target audio processing mode to the audio clip of the audio scene includes: reducing an audio bitrate of the audio clip according to a first set ratio or a first set value in response to the communication signal strength of the audio scene being less than a communication signal strength threshold; and increasing the audio bitrate of the audio clip according to a second set ratio or a second set value in response to the communication signal strength of the audio scene being greater than or equal to the communication signal strength threshold.

Taking a voice call scene as an example, multiple people in different environments are having a voice call, and transmit audio clips to a server through clients. The server receives the audio clips transmitted by the clients, performs audio scene classification processing based on the audio clips to obtain audio scene types corresponding to noise in the audio clips, and after determining bitrate switching processing modes matching the audio scene types, determines communication signal strengths of the audio scene. When the communication signal strength of the audio scene is less than a communication signal strength threshold, it means that the signal strength of the current audio scene is weak, and the bitrate is reduced. Therefore, the audio bitrate of the audio clip is reduced according to the first set ratio or first set value in the bitrate switching processing mode matching the audio scene type, to facilitate subsequent smooth audio interaction to avoid interruption of the voice call. When the communication signal strength of the audio scene is greater than or equal to the communication signal strength threshold, it means that the communication signal strength of the current audio scene is strong, and the call will not be interrupted even if the bitrate is not lowered, i.e., the bitrate is not reduced. Therefore, the audio bitrate of the audio clip is increased according to the second set ratio or the second set value in the bitrate switching processing mode, thereby improving the smoothness of audio interaction. The first set ratio and the second set ratio may be the same or different. The first set value and the second set value may be the same or different. The first set ratio, the second set ratio, the first set value, and the second set value may be set according to actual desirables.

An example of the manner of obtaining the communication signal strength of the audio scene is as follows: averaging communication signal strengths obtained by multiple times of sampling in the audio scene, and using a result of the averaging as the communication signal strength of the audio scene. For example, multiple sampling results of a user starting from the beginning of the voice call are averaged, and a result of the averaging is used as the communication signal strength of the user in the audio scene.

In some embodiments, the applying the target audio processing mode to the audio clip of the audio scene includes: determining jitter information of a strength of a communication signal in the audio scene based on strengths of the communication signal that are obtained by multiple times of sampling in the audio scene; and reducing an audio bitrate of the audio clip according to a third set ratio or a third set value in response to the jitter information indicating that the communication signal is in an unstable state.

For example, the communication signal strength is sampled multiple times in the audio scene, and the jitter change (i.e., jitter information) of the communication signal strength in the audio scene is obtained by normal distribution. When the variance in the normal distribution representing the jitter change is greater than a variance threshold, it means that data (that is, the communication signal) in the normal distribution is relatively scattered, and the communication signal strength jitters violently, which means that the communication signal strength is unstable. To avoid the subsequently frequent switching of the audio bitrate while ensuring the audio fluency, the audio bitrate of the audio clip may be reduced according to a preset ratio or preset value in the bitrate switching processing mode matching the audio scene type. The third set ratio and the third set value may be set according to actual desirables.

It is further determined whether bitrate switching is desired by determining the jitter change of the communication signal strength in the audio scene, to avoid frequent switching of the audio bitrate while ensuring the audio fluency, thereby improving the user experience.

In some embodiments, the applying the target audio processing mode to the audio clip of the audio scene includes: reducing an audio bitrate of the audio clip according to a fourth set ratio or a fourth set value in response to a type of a communication network for transmitting the audio clip being a set type.

For example, after determining the bitrate switching processing mode matching the audio scene type, it may also be determined whether the type of the communication network used to transmit the audio clip is a set type (for example, a WiFi network, a cellular network, etc.). For example, when it is determined that the type of the communication network used to transmit the audio clip is a WiFi network, indicating that the current audio clip is in an unstable environment, the audio bitrate of the audio clip may be reduced according to a preset ratio or preset value in the bitrate switching processing mode matching the audio scene type, to ensure the audio fluency. The third set ratio and the third set value may be set according to actual desirables.

The following describes an implementation of this embodiment of the present disclosure.

The embodiments of the present disclosure may be applied to various speech application scenes. For example, for an audio recording application, a user records an audio in the current speech scene through an audio recording client running in a terminal. The audio recording client performs speech scene identification on the recorded audio clip to determine a speech scene type, performs targeted noise reduction processing on the audio clip based on the speech scene type, and stores the denoised audio clip, thereby achieving a function of audio recording with denoising. For an instant messaging application, a user transmits a voice message in the current voice scene through an instant messaging client running in a terminal. The instant messaging client obtains a corresponding audio clip, performs voice scene identification on the audio clip to determine a voice scene type, performs targeted noise reduction processing on the audio clip based on the voice scene type, and transmits the denoised audio clip through the instant messaging client, thereby achieving a function of transmitting denoised speech. For a call application, user A has a voice call with user B. User A makes a voice call in the current speech scene through a call client running in a terminal. The call client obtains an audio clip of user A, automatically generates an audio adjustment request based on the audio clip of user A, and transmits the audio adjustment request to a server. Based on the audio adjustment request, the server performs speech scene identification on the audio clip of user A to determine the speech scene type, performs targeted noise reduction processing on the audio clip based on the speech scene type, and transmits the denoised audio clip of user A to user B, thereby achieving a voice call function with denoising.

The embodiments of the present disclosure provide an artificial intelligence-based audio processing method, where Mel frequency log energy features are extracted for an audio clip and normalized, and the normalized features are inputted into a neural network to predict a scene corresponding to the audio clip. Since the call scene is relatively more stable, the scene-based bitrate control has better stability. According to the noise characteristics of different scenes, adaptive learning, transfer learning, etc. may be used to obtain personalized noise reduction solutions for specific scenes. Switching the dedicated noise reduction mode for specific scenes based on the result of scene identification provides better noise reduction performance, thereby improving the call quality and user experience.

For example, in a real-time communication conference, with the continuous improvement of conference mobile terminals, users may join a conference in various environments (audio scene, voice scene, etc.), such as an office environment, a home environment, or a mobile transportation environment such as subway or high-speed rail. Different scenes bring scene-specific challenges to the real-time processing of audio signals. For example, in scenes such as high-speed rail where the signal strength is weak and unstable, audio communication often becomes intermittent, seriously affecting the communication quality; The specific background noise in different scenes (such as noise made by children playing, TV background sound, kitchen noise, etc. in the home environment) poses higher desirables on the robustness of the noise reduction algorithm.

To meet the desirables of users for conferencing in various scenes and improve the users' conference audio experience in complex environments, providing scene-specific solutions based on environmental characteristics is an important trend to adjust audio processing algorithms. Identifying the scene where an audio occurs is an important basis and foundation for realizing the scene-specific solutions. The embodiments of the present disclosure propose an audio scene classification solution, where scene-specific audio processing algorithms are adopted for the classification results of audio scenes. For example, in a high-speed rail scene where the signal strength is weak and unstable, automatic bitrate switching is performed to reduce the audio bitrate to avoid intermittent connectivity issues. By applying a noise reduction solution according to the identified scene, the experience of users joining a conference is improved.

The targeted noise reduction solution is for reducing the noise in particular scenes, for example, noise generated by keyboard pressing or friction of paper materials in the office environment; kitchen noise, noise made by children playing, or TV background sound in the home environment; station prompting sound of a moving vehicle, etc. Noise reduction models for the scenes (models for reducing or eliminating typical noise in the corresponding scenes) are trained adaptively based on a general noise reduction model. After a scene is identified, the noise reduction model corresponding to the scene is adopted for noise reduction. Targeted bitrate switching is used in specific scenes, e.g., a transportation environment such as a high-speed rail where the signal strength is weak, to reduce the bitrate of conference communication (for example, from 16k to 8k) to reduce the transmission burden and reduce intermittent connectivity, thereby improving the conference experience.

In the audio scene classification solution proposed in the embodiments of the present disclosure, corresponding frequency-domain spectrum features, i.e., Mel frequency log filterbank energy features, are first extracted according to a time-domain audio signal obtained, and the spectrum features are normalized. After normalization, these normalized spectrum features are inputted into a neural network model, such as a deep residual network (ResNet) based on a convolutional neural network (CNN), so that the neural network model constructs a model for the normalized spectrum features. In an actual test, the log energy spectrum of the inputted audio signal is first normalized and inputted to an established neural network model, and the neural network model outputs a scene classification result for each input audio clip. According to the scene result identified by the neural network model, the conference system may automatically switch the adaptive audio bitrate, adopt the targeted noise reduction solution suitable for the scene, and so on, to improve the overall voice call quality and user experience.

Figure 7:
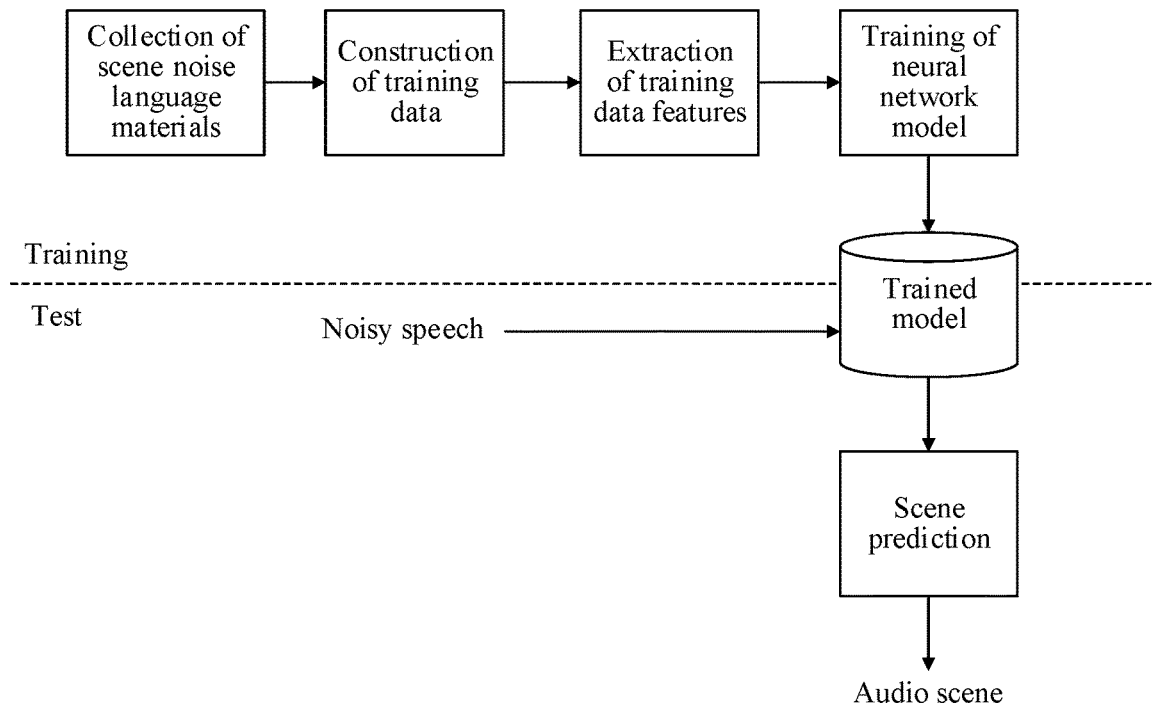
FIG. 7 is a schematic overall flowchart of audio scene identification according to certain embodiment(s) of the present disclosure.

As shown in FIG. 7, FIG. 7 is a schematic overall flowchart of audio scene identification according to an embodiment of the present disclosure. The audio scene identification includes a training stage training and a testing stage, including five modules, namely: 1) scene noise language material collection; 2) construction of training data; 3) extraction of training data features; 4) training of neural network model; and 5) Scene prediction.

1) Scene Noise Language Material Collection

Background noise in different scenes are collected. The background noise includes, for example, noise generated by keyboard pressing or friction of paper materials in the office environment; kitchen noise, noise made by children playing, or TV background sound in the home environment; station prompting sound of a moving vehicle, etc.

2) Construction of Training Data

The background noise collected in different scenes and different clean audio (noise-free speech) are superimposed in the time domain to generate a mixed signal of scene noise and clean audio, which is used as an input to train the neural network model. During superimposing, to prevent the voice amplitude after superimposition from exceeding a system threshold and enhance the data diversity to better simulate an audio in a real environment, not only human voice and noise are superimposed at the original ratio of 1:1, but also the human voice and the background noise are further superimposed based on some random ratios, for example, a human voice superposition coefficient which is a random number ranging from 0.5 to 0.7 and a noise superposition coefficient which is a random number ranging from 0.3 to 0.5.

3) Extraction of Training Data Features

Operations such as framing, windowing, and Fourier transform are performed on the audio signal in the training data to obtain Mel log energy spectrum features.

Figure 8:
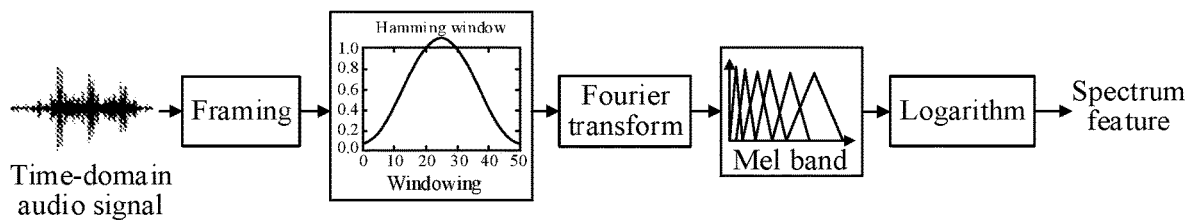
FIG. 8 is a schematic flowchart of extracting a spectrum feature from a time-domain acoustical signal according to certain embodiment(s) of the present disclosure.

As shown in FIG. 8, FIG. 8 is a schematic flowchart of extracting a spectrum feature from a time-domain acoustical signal according to an embodiment of the present disclosure. First, a framing operation is performed on the time domain signal according to a short-term transient assumption, to convert a continuous signal into discrete vectors. Afterward, each frame of audio signal is smoothed by windowing to reduce or eliminate edge discontinuity. A Fourier Transform (FT) is performed on each frame to obtain a frequency domain signal. Mel bands are applied to the frequency domain signal to obtain energy in each band. Based on the nonlinear response of human ears to audio, Mel bands are used herein to replace linear bands to better simulate the human ear response. Finally, a logarithmic operation is performed to obtain Mel log spectrum features.

4) Training of Neural Network Model

The input to the neural network model is three channels of Mel log energy spectrum features of scene noise superimposed on clean audio, and the output of the neural network model is the classification result of scene identification. During the training process, a cross entropy error is used as the loss function, and the training objective is to minimize the loss function:

$$\min_{\theta} L(\theta) = -\sum_i t_i \log o_i,$$

where, $t_i$ represents a correct scene annotation of the input audio, and $o_i$ represents the scene type predicted by the neural network model.

Figure 9:
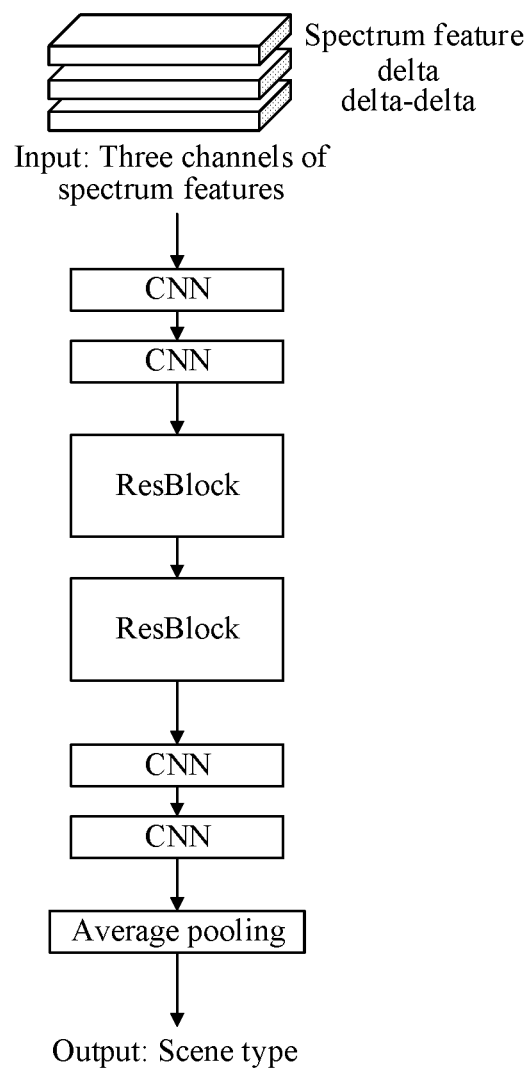
FIG. 9 is a schematic structural diagram of a neural network model according to certain embodiment(s) of the present disclosure.

As shown in FIG. 9, FIG. 9 is a schematic structural diagram of a neural network model according to an embodiment of the present disclosure. The neural network model includes two ResNet units, multiple CNN networks, and an average pooling layer. Mel log energy features, first-order derivatives and second-order derivative thereof form three channels of input signals. The neural network model finally outputs the scene classification result.

Figure 10:
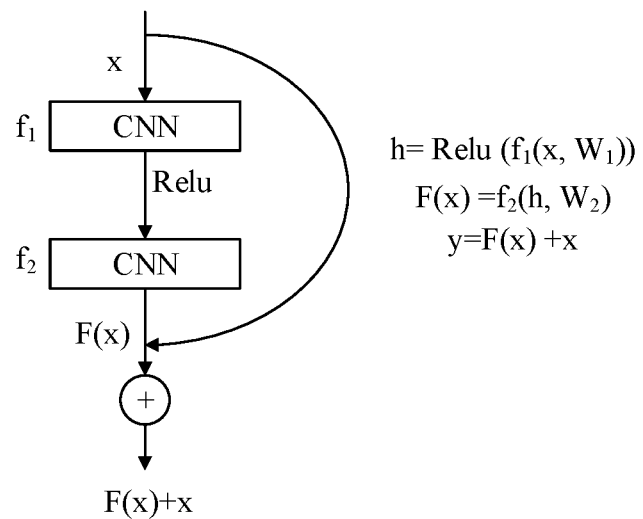
FIG. 10 is a schematic structural diagram of a ResNet unit according to certain embodiment(s) of the present disclosure.

The neural network model uses ResNet units. As shown in FIG. 10, FIG. 10 is a schematic structural diagram of a ResNet unit according to an embodiment of the present disclosure. Each ResNet unit includes two CNN layers, where x and y represent the input and output of the residual unit respectively, f1 and f2 respectively represent function mappings of the two CNN layers, and W1 and W2 respectively represent weight parameters corresponding to the two CNN layers. The CNN layer can effectively capture the scene noise features in the spectral information, and the residual network can effectively prevent the gradient disappearance problem in the training error propagation of the neural network.

5) Scene Prediction.

After training the neural network model, optimal model parameters are selected and saved as a trained model. During testing, the spectrum features extracted from the normalized noisy speech are inputted into the trained model, and the trained model outputs a predicted audio scene. Subsequently, scene-specific audio processing algorithms are adopted for the classification results of audio scenes. For example, in a high-speed rail scene where the signal strength is weak and unstable, automatic bitrate switching is performed to reduce the audio bitrate to avoid intermittent connectivity issues. By applying a noise reduction solution according to the identified scene, the experience of users joining a conference is improved.

Based on the above, in the embodiments of the present disclosure, a lightweight audio scene identification model is constructed, which desires less storage space and achieves a higher prediction speed. As a front-end algorithm, the audio scene identification model may be used as a basis and foundation for subsequent adjustment of complex algorithms. Based on the audio scene identification results, the audio bitrate is adjusted and controlled, and scene-specific audio solutions such as scene-specific noise reduction solutions are adopted.

Thus, the artificial intelligence-based audio processing method provided in the embodiments of the present disclosure has been described with reference to applications and implementations of the server provided in the embodiments of the present disclosure. The embodiments of the present disclosure further provide an audio processing method. In actual applications, functional modules in the audio processing apparatus may be cooperatively implemented by hardware resources of an electronic device (such as a terminal device, a server or a server cluster), for example, computing resources such as a processor, communication resources (which are, for example, used for supporting implementation of various types of communication such as optical cable communication and cellular communication), and a storage. FIG. 2 shows an audio processing apparatus 555 stored in the memory 550, which may be software in the form of a program or plug-in, for example, a software module designed in a programming language such as C/C++ and Java, or a special software module, application programming interface, plug-in, cloud service, etc. in application software or a large-scale software system designed in a programming language such as C/C++ and Java. Different implementations are described below by way of example.

Example 1. The Audio Processing Apparatus is a Mobile Application and Module

The audio processing apparatus 555 in the embodiments of the present disclosure may be provided as a software module designed in a programming language such as software C/C++ and Java, and may be embedded in various mobile applications based on systems such as Android or iOS (e.g., stored as executable instructions in a storage medium of a mobile terminal, and executed by a processor of the mobile terminal), to directly use computing resources of the mobile terminal to implement the related information recommendation tasks and periodically or irregularly transmit the processing results to a remote server through various network communication methods or save the processing results locally on the mobile terminal.

Example 2. The Audio Processing Apparatus is a Server Application and Platform

The audio processing apparatus 555 in the embodiments of the present disclosure may be provided as special software module in application software or a large-scale software system designed in a programming language such as C/C++ and Java, and may be run on a server terminal (e.g., stored as executable instructions in a storage medium of the server terminal, and executed by a processor of the server terminal), and the server uses its own computing resources to implement the related information recommendation tasks.

The embodiments of the present disclosure may further be provided on a distributed and parallel computing platform including multiple servers, and be attached a customized and readily interactive Web interface or various other user interfaces (UI), to form an information recommendation platform (for recommending a list) for a person, a group or an enterprise to use.

Example 3: The Audio Processing Apparatus is a Server-Side API and Plug-In

The audio processing apparatus 555 in the embodiments of the present disclosure may be provided as a server-side API or plug-in for the user to call to execute the artificial intelligence-based audio processing method according to the embodiments of the present disclosure and be embedded in various applications.

Example 4. The Audio Processing Apparatus is a Mobile Device Client API and Plug-In The audio processing apparatus 555 in the embodiments of the present disclosure may be provided as an API or plug-in on the mobile device side for the user to call to execute the artificial intelligence-based audio processing method according to the embodiments of the present disclosure.

Example 5. The Audio Processing Apparatus is an Open Cloud Service

The audio processing apparatus 555 in the embodiments of the present disclosure may be provided as a cloud service for information recommendation developed for users, for a person, group, or enterprise to obtain a recommended list.

The audio processing apparatus 555 includes a series of modules, including an obtaining module 5551, a classification module 5552, a processing module 5553, and a training module 5554. The following continues to describe the audio processing solution implemented through cooperation of the modules in the audio processing apparatus 555 provided in the embodiments of the present disclosure.

The obtaining module 5551 is configured to obtain an audio clip of an audio scene, the audio clip including noise. The classification module 5552 is configured to perform audio scene classification processing based on the audio clip to obtain an audio scene type corresponding to the noise in the audio clip. The processing module 5553 is configured to determine a target audio processing mode corresponding to the audio scene type, and apply the target audio processing mode to the audio clip according to a degree of interference caused by the noise in the audio c In some embodiments, the target audio processing mode includes a noise reduction processing mode; and the processing module 5553 is further configured to query a correspondence between different candidate audio scene types and candidate noise reduction processing modes based on the audio scene type corresponding to the audio scene, to obtain a noise reduction processing mode corresponding to the audio scene type.

In some embodiments, the target audio processing mode includes a noise reduction processing mode; and the processing module 5553 is further configured to determine a noise type matching the audio scene type based on the audio scene type corresponding to the audio scene; and query a correspondence between different candidate noise types and candidate noise reduction processing modes based on the noise type matching the audio scene type, to obtain a noise reduction processing mode corresponding to the audio scene type, noise types matching different audio scene types being not exactly the same.

In some embodiments, before applying the target audio processing mode to the audio clip of the audio scene, the processing module 5553 is further configured to determine the degree of interference caused by the noise in the audio clip; and apply the noise reduction processing mode corresponding to the audio scene type to the audio clip in response to the degree of interference being greater than an interference degree threshold.

In some embodiments, the processing module 5553 is further configured to perform matching processing on the noise type matching the audio scene type and the noise in the audio clip; and suppress the noise successfully matched with the noise type to obtain a suppressed audio clip, a ratio of a speech signal strength to a noise signal strength in the suppressed audio clip being lower than a signal-to-noise ratio threshold.

In some embodiments, the target audio processing mode includes a bitrate switching processing mode; and the processing module 5553 is further configured to query a correspondence between different candidate audio scene types and candidate bitrate switching processing modes based on the audio scene type corresponding to the audio scene, to obtain a bitrate switching processing mode corresponding to the audio scene type.

In some embodiments, the target audio processing mode includes a bitrate switching processing mode; and the processing module 5553 is further configured to compare the audio scene type corresponding to the audio scene with a preset audio scene type; and determine a bitrate switching processing mode associated with the preset audio scene type as a bitrate switching processing mode corresponding to the audio scene type in response to determining through the comparison that the audio scene type is the preset audio scene type.

In some embodiments, the processing module 5553 is further configured to obtain a communication signal strength of the audio scene; reduce an audio bitrate of the audio clip according to a first set ratio or a first set value in response to the communication signal strength of the audio scene being less than a communication signal strength threshold; and increase the audio bitrate of the audio clip according to a second set ratio or a second set value in response to the communication signal strength of the audio scene being greater than or equal to the communication signal strength threshold.

In some embodiments, the processing module 5553 is further configured to determine jitter information of a strength of a communication signal in the audio scene based on strengths of the communication signal that are obtained by multiple times of sampling in the audio scene; and reduce an audio bitrate of the audio clip according to a third set ratio or a third set value in response to the jitter information indicating that the communication signal is in an unstable state.

In some embodiments, the processing module 5553 is further configured to reduce an audio bitrate of the audio clip according to a fourth set ratio or set value in response to a type of a communication network for transmitting the audio clip being a set type.

In some embodiments, the audio scene classification processing is implemented by a neural network model, and the neural network model learns an association between the noise included in the audio clip and the audio scene type; and the classification module 5552 is further configured to call the neural network model based on the audio clip to perform the audio scene classification processing to obtain an audio scene type having an association with the noise included in the audio clip.

In some embodiments, the neural network model includes a mapping network, a residual network, and a pooling network; and the classification module 5552 is further configured to perform feature extraction processing on the audio clip through the mapping network to obtain a first feature vector of the noise in the audio clip; perform mapping processing on the first feature vector through the residual network to obtain a mapping vector of the audio clip; perform feature extraction processing on the mapping vector of the audio clip through the mapping network to obtain a second feature vector of the noise in the audio clip; perform pooling processing on the second feature vector through the pooling network to obtain a pooled vector of the audio clip; and perform non-linear mapping processing on the pooled vector of the audio clip to obtain the audio scene type having an association with the noise included in the audio clip.

In some embodiments, the mapping network includes a plurality of cascaded mapping layers; and the classification module 5552 is further configured to perform feature mapping processing on the audio clip through a first mapping layer in the plurality of cascaded mapping layers; output a mapping result of the first mapping layer to a subsequent mapping layer in the plurality of cascaded mapping layers, and continue to perform feature mapping and mapping result outputting through the subsequent mapping layer, until an output is provided to a last mapping layer; and determine a mapping result outputted by the last mapping layer as the first feature vector of the noise in the audio clip.

In some embodiments, the residual network includes a first mapping network and a second mapping network; and the classification module 5552 is further configured to perform mapping processing on the first feature vector through the first mapping network to obtain a first mapping vector of the audio clip; perform nonlinear mapping processing on the first mapping vector to obtain a non-mapping vector of the audio clip; perform mapping processing on the non-mapping vector of the audio clip through the first mapping network to obtain a second mapping vector of the audio clip; and determine a summation result of the first feature vector of the audio clip and the second mapping vector of the audio clip as the mapping vector of the audio clip.

In some embodiments, the apparatus further includes: a training module 5554, configured to construct audio samples respectively corresponding to a plurality of different audio scenes based on a noise-free audio signal and background noise respectively corresponding to the plurality of different audio scenes; and train a neural network model based on the audio samples respectively corresponding to the plurality of different audio scenes to obtain a neural network model for audio scene classification.

In some embodiments, the training module 5554 is further configured to perform following processing for any one of the plurality of different audio scenes: fuse the background noise of the audio scene and the noise-free audio signal based on a fusion ratio of the background noise of the audio scene and the noise-free audio signal to obtain a first fused audio signal of the audio scene; fuse the background noise of the audio scene corresponding to a first random coefficient in the first fused audio signal to obtain a second fused audio signal of the audio scene; and fuse the noise-free audio signal corresponding to a second random coefficient in the second fused audio signal to obtain an audio sample of the audio scene.

In some embodiments, the training module 5554 is further configured to perform audio scene classification processing on the audio samples respectively corresponding to the plurality of different audio scenes through the neural network model, to obtain predicted audio scene types of the audio samples; construct a loss function of the neural network model based on the predicted audio scene types of the audio samples, audio scene annotations of the audio samples, and weights of the audio samples; and update a parameter of the neural network model until the loss function converges, and determine the updated parameter of the neural network model that causes the loss function to converge as a parameter of the neural network model for audio scene classification.

In some embodiments, before performing the audio scene classification processing based on the audio clip, the obtaining module 5551 is further configured to perform framing processing on a time domain signal of the audio clip to obtain a multi-frame audio signal; window the multi-frame audio signal, and perform a Fourier transform on the windowed audio signal to obtain a frequency domain signal of the audio clip; and perform logarithmic processing on a Mel band of the frequency domain signal to obtain the audio clip for the audio scene classification.

An embodiment of the present disclosure provides a computer program product or a computer program. The computer program product or the computer program includes computer instructions, and the computer instructions are stored in a computer-readable storage medium. A processor of a computing device reads the computer instructions from the computer-readable storage medium, and executes the computer instructions, so that the computing device executes the artificial intelligence-based audio processing method in the embodiments of the present disclosure.

An embodiment of the present disclosure provides a computer-readable storage medium storing executable instructions, the executable instructions, when executed by a processor, causing the processor to execute the artificial intelligence-based audio processing method provided in the embodiments of the present disclosure, for example, the artificial intelligence-based audio processing method shown in FIG. 3 to FIG. 5.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

What is claimed is:

1. An artificial intelligence-based audio processing method, comprising:
    obtaining an audio clip of an audio scene, the audio clip including noise;
    performing audio scene classification processing based on the audio clip to obtain an audio scene type corresponding to the noise in the audio clip; and
    determining a target audio processing mode corresponding to the audio scene type, and applying the target audio processing mode to the audio clip according to a degree of interference caused by the noise in the audio clip,
    wherein the target audio processing mode includes a noise reduction processing mode, and determining the target audio processing mode comprises:
        querying a correspondence between different candidate audio scene types and candidate noise reduction processing modes based on the audio scene type corresponding to the audio scene, to obtain a noise reduction processing mode corresponding to the audio scene type.

2. The method according to claim 1, wherein determining the target audio processing mode further comprises:
    determining a noise type matching the audio scene type based on the audio scene type corresponding to the audio scene; and
    querying a correspondence between different candidate noise types and the candidate noise reduction processing modes based on the noise type matching the audio scene type, to obtain the noise reduction processing mode corresponding to the audio scene type,
    noise types matching different audio scene types being not exactly the same.

3. The method according to claim 1, wherein applying the target audio processing mode comprises:
    determining the degree of interference caused by the noise in the audio clip; and
    applying the noise reduction processing mode corresponding to the audio scene type to the audio clip in response to the degree of interference being greater than an interference degree threshold.

4. The method according to claim 1, wherein applying the target audio processing mode comprises:
    performing matching processing on the noise type matching the audio scene type and the noise in the audio clip; and
    suppressing the noise successfully matched with the noise type to obtain a suppressed audio clip,
    a ratio of a speech signal strength to a noise signal strength in the suppressed audio clip being lower than a signal-to-noise ratio threshold.

5. The method according to claim 1, wherein the target audio processing mode further includes a bitrate switching processing mode, and determining the target audio processing mode further comprises:
    querying a correspondence between different candidate audio scene types and candidate bitrate switching processing modes based on the audio scene type corresponding to the audio scene, to obtain a bitrate switching processing mode corresponding to the audio scene type.

6. The method according to claim 1, wherein the target audio processing mode further includes a bitrate switching processing mode, and determining the target audio processing mode further comprises:
    comparing the audio scene type corresponding to the audio scene with a preset audio scene type; and
    determining a bitrate switching processing mode associated with the preset audio scene type as a bitrate switching processing mode corresponding to the audio scene type in response to determining through the comparison that the audio scene type is the preset audio scene type.

7. The method according to claim 5, wherein applying the target audio processing mode comprises:
    obtaining a communication signal strength of the audio scene;
    reducing an audio bitrate of the audio clip according to a first set ratio or a first set value in response to the communication signal strength of the audio scene being less than a communication signal strength threshold; and
    increasing the audio bitrate of the audio clip according to a second set ratio or a second set value in response to the communication signal strength of the audio scene being greater than or equal to the communication signal strength threshold.

8. The method according to claim 5, wherein applying the target audio processing mode comprises:
    determining jitter information of a strength of a communication signal in the audio scene based on strengths of the communication signal that are obtained by multiple times of sampling in the audio scene; and
    reducing an audio bitrate of the audio clip according to a third set ratio or a third set value in response to the jitter information indicating that the communication signal is in an unstable state.

9. The method according to claim 5, wherein applying the target audio processing mode to the audio clip comprises:
    reducing an audio bitrate of the audio clip according to a fourth set ratio or set value in response to a type of a communication network for transmitting the audio clip being a set type.

10. The method according to claim 1, wherein the audio scene classification processing is implemented by a neural network model, and the neural network model learns an association between the noise included in the audio clip and the audio scene type, and performing audio scene classification processing comprises:
    calling the neural network model based on the audio clip to perform the audio scene classification processing to obtain an audio scene type having an association with the noise comprised in the audio clip.

11. The method according to claim 10, wherein the neural network model includes a mapping network, a residual network, and a pooling network, and calling the neural network model comprises:

performing feature extraction processing on the audio clip through the mapping network to obtain a first feature vector of the noise in the audio clip;
performing mapping processing on the first feature vector through the residual network to obtain a mapping vector of the audio clip;
performing feature extraction processing on the mapping vector of the audio clip through the mapping network to obtain a second feature vector of the noise in the audio clip;
performing pooling processing on the second feature vector through the pooling network to obtain a pooled vector of the audio clip; and
performing non-linear mapping processing on the pooled vector of the audio clip to obtain the audio scene type having an association with the noise comprised in the audio clip.

12. The method according to claim 11, wherein the mapping network includes a plurality of cascaded mapping layers, and performing the feature extraction processing comprises:
performing feature mapping processing on the audio clip through a first mapping layer in the plurality of cascaded mapping layers;
outputting a mapping result of the first mapping layer to a subsequent mapping layer in the plurality of cascaded mapping layers, and continuing to perform feature mapping and mapping result outputting through the subsequent mapping layer, until an output is provided to a last mapping layer; and
determining a mapping result outputted by the last mapping layer as the first feature vector of the noise in the audio clip.

13. The method according to claim 11, wherein the residual network includes a first mapping network and a second mapping network, and performing the mapping processing comprises:
performing mapping processing on the first feature vector through the first mapping network to obtain a first mapping vector of the audio clip;
performing nonlinear mapping processing on the first mapping vector to obtain a non-mapping vector of the audio clip;
performing mapping processing on the non-mapping vector of the audio clip through the first mapping network to obtain a second mapping vector of the audio clip; and
determining a summation result of the first feature vector of the audio clip and the second mapping vector of the audio clip as the mapping vector of the audio clip.

14. The method according to claim 10, wherein neural network model is obtained by:
constructing audio samples respectively corresponding to a plurality of different audio scenes based on a noise-free audio signal and background noise respectively corresponding to the plurality of different audio scenes; and
training a neural network model based on the audio samples respectively corresponding to the plurality of different audio scenes to obtain a neural network model for audio scene classification.

15. The method according to claim 14, wherein constructing the audio samples comprises:
performing following processing for any one of the plurality of different audio scenes:
fusing the background noise of the audio scene and the noise-free audio signal based on a fusion ratio of the background noise of the audio scene and the noise-free audio signal to obtain a first fused audio signal of the audio scene;
fusing the background noise of the audio scene corresponding to a first random coefficient in the first fused audio signal to obtain a second fused audio signal of the audio scene; and
fusing the noise-free audio signal corresponding to a second random coefficient in the second fused audio signal to obtain an audio sample of the audio scene.

16. The method according to claim 14, wherein training the neural network model comprises:
performing audio scene classification processing on the audio samples respectively corresponding to the plurality of different audio scenes through the neural network model, to obtain predicted audio scene types of the audio samples;
constructing a loss function of the neural network model based on the predicted audio scene types of the audio samples, audio scene annotations of the audio samples, and weights of the audio samples; and
updating a parameter of the neural network model until the loss function converges, and determining the updated parameter of the neural network model that causes the loss function to converge as a parameter of the neural network model for audio scene classification.

17. The method according to claim 1, further comprising:
performing framing processing on a time domain signal of the audio clip to obtain a multi-frame audio signal;
windowing the multi-frame audio signal, and performing a Fourier transform on the windowed audio signal to obtain a frequency domain signal of the audio clip; and
performing logarithmic processing on a Mel band of the frequency domain signal to obtain the audio clip for the audio scene classification.

18. An audio processing apparatus, comprising: a memory storing computer program instructions; and a processor coupled to the memory and configured to execute the computer program instructions and perform:
obtaining an audio clip of an audio scene, the audio clip including noise;
performing audio scene classification processing based on the audio clip to obtain an audio scene type corresponding to the noise in the audio clip; and
determining a target audio processing mode corresponding to the audio scene type, and applying the target audio processing mode to the audio clip according to a degree of interference caused by the noise in the audio clip,
wherein the target audio processing mode includes a noise reduction processing mode, and determining the target audio processing mode comprises:
querying a correspondence between different candidate audio scene types and candidate noise reduction processing modes based on the audio scene type corresponding to the audio scene, to obtain a noise reduction processing mode corresponding to the audio scene type.

19. A non-transitory computer-readable storage medium storing computer program instructions executable by at least one processor to perform:
obtaining an audio clip of an audio scene, the audio clip including noise;
performing audio scene classification processing based on the audio clip to obtain an audio scene type corresponding to the noise in the audio clip; and determining a target audio processing mode corresponding to the audio scene type, and applying the target audio processing mode to the audio clip according to a degree of interference caused by the noise in the audio clip, wherein the target audio processing mode includes a noise reduction processing mode, and determining the target audio processing mode comprises:

querying a correspondence between different candidate audio scene types and candidate noise reduction processing modes based on the audio scene type corresponding to the audio scene, to obtain a noise reduction processing mode corresponding to the audio scene type.

\* \* \* \* \*